United States Patent
Park et al.

(10) Patent No.: US 10,104,617 B2
(45) Date of Patent: Oct. 16, 2018

(54) POWER SAVE MODE-BASED OPERATING METHOD AND DEVICE IN WLAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/112,665

(22) PCT Filed: Nov. 20, 2014

(86) PCT No.: PCT/KR2014/011155
§ 371 (c)(1),
(2) Date: Jul. 19, 2016

(87) PCT Pub. No.: WO2015/119360
PCT Pub. Date: Aug. 13, 2015

(65) Prior Publication Data
US 2016/0345266 A1    Nov. 24, 2016

Related U.S. Application Data

(60) Provisional application No. 61/935,787, filed on Feb. 4, 2014, provisional application No. 61/935,852, filed
(Continued)

(51) Int. Cl.
*H04W 4/00* (2018.01)
*H04W 52/02* (2009.01)
*H04W 84/12* (2009.01)

(52) U.S. Cl.
CPC ........ *H04W 52/0235* (2013.01); *H04W 84/12* (2013.01); *Y02D 70/00* (2018.01);
(Continued)

(58) Field of Classification Search
CPC ................................................. H04W 52/0235
(Continued)

(56) References Cited

U.S. PATENT DOCUMENTS

2005/0122927 A1* 6/2005 Wentink ............... H04B 7/2126
370/311
2006/0083168 A1* 4/2006 Prakash ............ H04W 52/0232
370/230
(Continued)

FOREIGN PATENT DOCUMENTS

| CN | 101529824 | 9/2009 |
|----|-----------|--------|
| JP | 2010-507349 | 3/2010 |

(Continued)

OTHER PUBLICATIONS

PCT International Application No. PCT/KR2014/011155, International Search Report dated Jan. 21, 2015, 2 pages.
(Continued)

*Primary Examiner* — Brandon Renner
*Assistant Examiner* — Abdeltif Ajid
(74) *Attorney, Agent, or Firm* — Lee Hong Degerman Kang & Waimey

(57) ABSTRACT

A power save mode-based operating method and device in a WLAN are disclosed. The power save mode-based operating method in the WLAN may include: transmitting, by an STA, a first trigger frame to an AP; receiving, by the STA, a downlink frame transmitted by the AP based on the first trigger frame on a first service section; receiving, by the STA, traffic indication information from the AP on a second service section after the reception of the downlink frame;
(Continued)

determining, by the STA, the presence or absence of a pending downlink frame at the AP based on the traffic indication information on the second service section; and determining, by the STA, a power saving mode based on the presence or absence of the pending downlink frame.

10 Claims, 13 Drawing Sheets

Related U.S. Application Data on Feb. 5, 2014, provisional application No. 61/942,587, filed on Feb. 20, 2014, provisional application No. 61/982,349, filed on Apr. 22, 2014, provisional application No. 62/066,885, filed on Oct. 21, 2014.

(52) U.S. Cl.
CPC ........ *Y02D 70/1262* (2018.01); *Y02D 70/142* (2018.01); *Y02D 70/22* (2018.01); *Y02D 70/23* (2018.01)

(58) Field of Classification Search
USPC ........................................................ 370/338
See application file for complete search history.

(56) References Cited

U.S. PATENT DOCUMENTS

| | | | | |
|---|---|---|---|---|
| 2007/0161364 A1* | 7/2007 | Surineni | ........... | H04W 52/0225 455/343.4 |
| 2007/0230418 A1* | 10/2007 | Takeuchi | .......... | H04W 52/0225 370/338 |
| 2007/0238438 A1 | 10/2007 | Alon et al. | | |
| 2007/0281617 A1* | 12/2007 | Meylan | ................. | H04W 16/14 455/41.2 |
| 2008/0095091 A1 | 4/2008 | Shravan et al. | | |
| 2009/0196211 A1* | 8/2009 | Wentink | ............ | H04W 52/0235 370/311 |
| 2011/0158144 A1* | 6/2011 | Sung | ................. | H04W 52/0216 370/311 |
| 2012/0188925 A1* | 7/2012 | Lee | ...................... | H04B 7/0452 370/311 |

FOREIGN PATENT DOCUMENTS

| | | | | |
|---|---|---|---|---|
| KR | 1020060105187 | | 10/2006 | |
| KR | 1020110109992 | | 10/2011 | |
| KR | 1020120041144 | | 4/2012 | |
| KR | 1020130041813 | | 4/2013 | |
| WO | WO2007137251 A2 * | | 11/2007 | ............ H04L 12/28 |
| WO | 2008/115282 | | 9/2008 | |
| WO | 2013/032657 | | 3/2013 | |

OTHER PUBLICATIONS

Japan Patent Office Application No. 2016-549073, Office Action dated Aug. 10, 2017, 6 pages.
Mathilde Benveniste (Avaya Labs), "Power Save in 802.11e WLANs," IEEE 802.11-04/464r2, May 2004, 19 pages.

* cited by examiner

FIG. 1
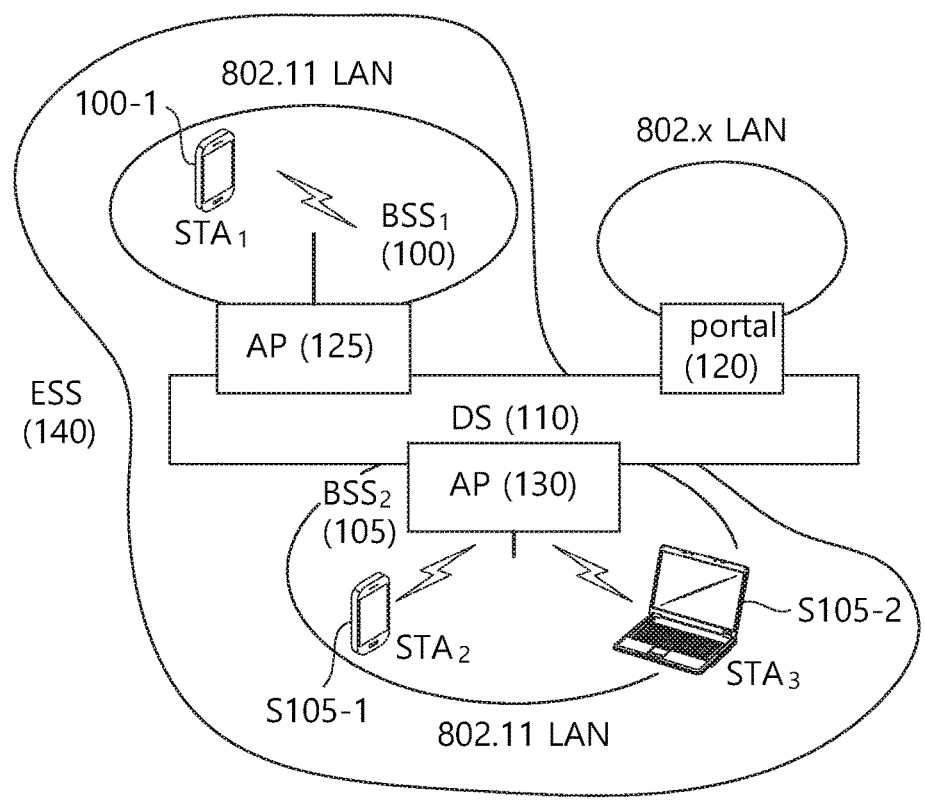
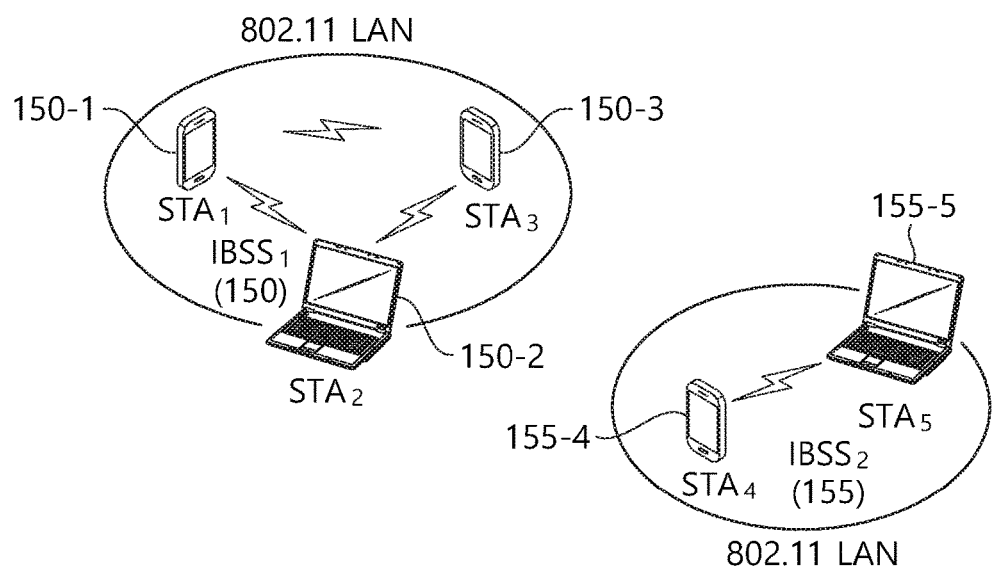

POWER SAVE MODE-BASED OPERATING METHOD AND DEVICE IN WLAN

CROSS-REFERENCE TO RELATED APPLICATIONS

This application is the National Stage filing under 35 U.S.C. 371 of International Application No. PCT/KR2014/011155, filed on Nov. 20, 2014, which claims the benefit of U.S. Provisional Application No. 61/935,787, filed on Feb. 4, 2014, 61/935,852, filed on Feb. 5, 2014, 61/942,587, filed on Feb. 20, 2014, 61/982,349, filed on Apr. 22, 2014 and 62/066,885, filed on Oct. 21, 2014, the contents of which are all hereby incorporated by reference herein in their entirety.

BACKGROUND OF THE INVENTION

Field of the Invention

The present invention relates to wireless communications, and more particularly, to a method and apparatus operating based on a power save mode in a wireless local area network (WLAN).

Related Art

An IEEE 802.11 standard provides a power save mechanism (or power save mode) to increase the lifespan of a wireless local area network (WLAN) station (STA). The STA operating based on the power save mode may operate in an awake state or a doze state for power saving. The awake state is a state which enables a normal operation of the STA such as frame transmission or reception, channel scanning, etc. On the other hand, the doze state is a state in which power consumption is extremely reduced and thus frame transmission or reception and channel scanning are impossible. In a case where the STA usually operates in the power save mode, the STA is in the doze state and, when necessary, transitions to the awake state, thereby reducing power consumption.

If the STA operates for a long time in the doze state, power consumption of the STA is reduced. Therefore, the lifespan of the STA may be increased. However, frame transmission or reception is impossible in the doze state. Therefore, the STA cannot stay for a long time in the doze state. If a pending frame is generated in the doze state, the STA may transition to the awake state to transmit the frame to an access point (AP). However, if the STA is in the doze state and a pending frame to be transmitted to the STA exists in the AP, the STA cannot receive the pending frame from the AP, and cannot know that the pending frame exists in the AP. Therefore, the STA may acquire information regarding the presence/absence of the pending frame in the AP, and may operate by periodically transitioning to the awake mode in order to receive the pending frame in the AP.

The AP may acquire information regarding awake mode operating timing of the STA, and may transmit the information regarding the presence of the pending frame in the AP according to the awake mode operating timing of the STA.

More specifically, in order to receive information regarding the presence/absence of a frame to be received from the AP, the STA may periodically transition from the doze state to the awake state to receive a beacon frame. The AP may report the presence/absence of a frame to be transmitted to each STA on the basis of a traffic indication map (TIM) included in the beacon frame. The TIM is used to report the presence of a unicast frame to be transmitted to the STA, and a delivery traffic indication map (DTIM) may be used to report the presence of a multicast frame/broadcast frame to be transmitted to the STA.

SUMMARY OF THE INVENTION

An object of the present invention is to provide a method operating based on a power save mode in a wireless local area network (WLAN).

Another object of the present invention is to provide an apparatus operating based on a power save mode in a WLAN.

In order to achieve the aforementioned purpose of the present invention, according to one aspect of the present invention, there is provided a method operating based on a power save mode in a WLAN. The method may include: transmitting, by a station (STA), a first trigger frame to an access point (AP) on a first service period; receiving, by the STA, a downlink frame transmitted by the AP on the basis of the first trigger frame on the first service period; monitoring, by the STA, a pending downlink frame or null data frame transmitted from the AP on second service period after receiving the downlink frame; and determining, by the STA, a power saving mode according to whether the pending downlink frame or the null data frame is received on the second service period. The pending downlink frame may be transmitted by the AP in the presence of the pending downlink data for the STA. The null data frame may be transmitted by the AP in the absence of the pending downlink data.

In order to achieve the aforementioned purpose of the present invention, according to another aspect of the present invention, there is provided an STA operating based on a power save mode in a WLAN. The STA may include: a radio frequency (RF) unit implemented to transmit or receive a radio signal; and a processor operatively coupled to the RF unit. The processor may be implemented to: transmit a first trigger frame to an AP on a first service period; receive a downlink frame transmitted by the AP on the basis of the first trigger frame on the first service period; monitor a pending downlink frame or null data frame transmitted from the AP on second service period after receiving the downlink frame; and determine a power saving mode according to whether the pending downlink frame or the null data frame is received on the second service period. The pending downlink frame may be transmitted by the AP in the presence of the pending downlink data for the STA. The null data frame may be transmitted by the AP in the absence of the pending downlink data.

Since a new power save mode is defined, efficiency of real time traffic transmission can be increased in a dense environment, and power consumed in a station (STA) can be saved.

BRIEF DESCRIPTION OF THE DRAWINGS

FIG. 1 is a concept view illustrating the structure of a wireless local area network (WLAN).

DESCRIPTION OF EXEMPLARY EMBODIMENTS

Figure 2:
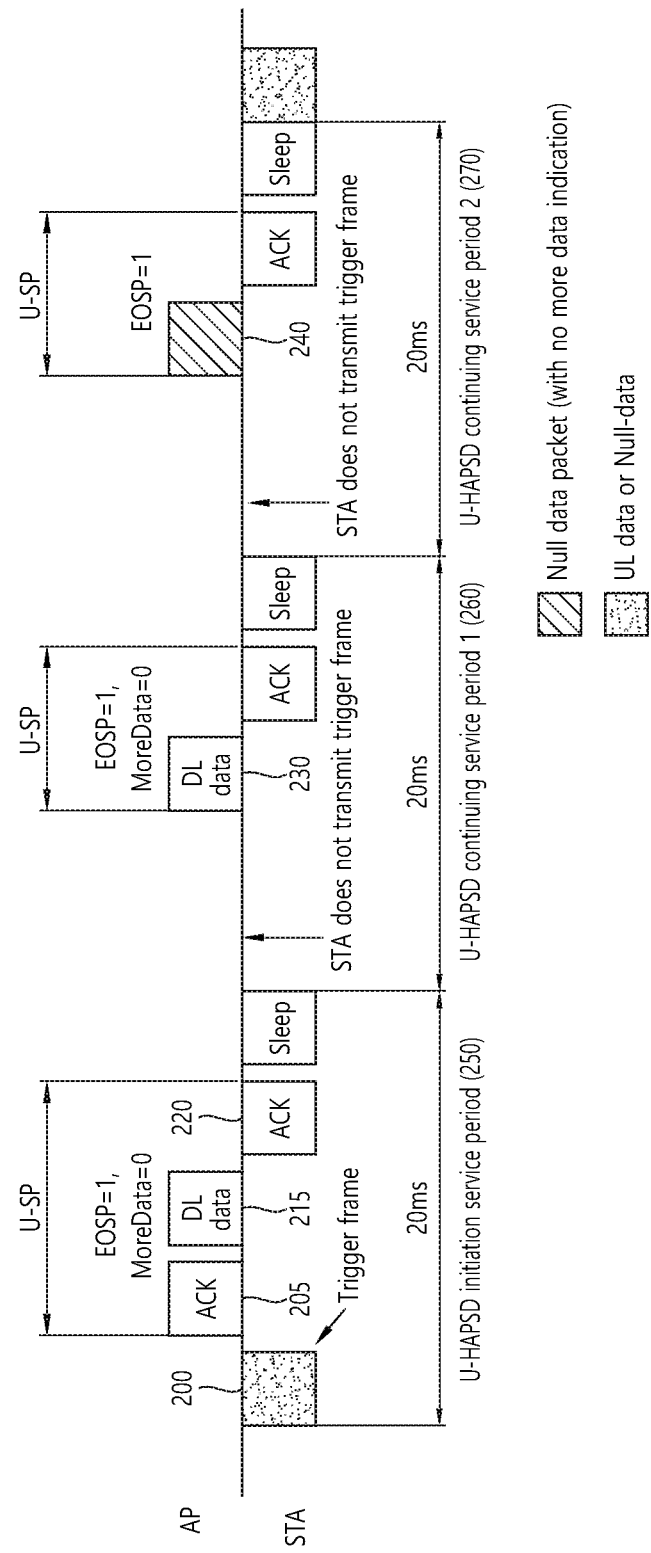
FIG. 2 is a concept view illustrating an unscheduled hybrid automatic power save delivery (U-HAPSD) procedure according to an embodiment of the present invention.

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

In order to increase the lifespan of a WLAN STA, a power save mechanism (or a power save mode) may be used. The STA operating based on the power save mode may operate in an awake state or a doze state for power saving. The awake state is a state which enables a normal operation of the STA such as frame transmission or reception, channel scanning, etc. On the other hand, the doze state is a state in which power consumption is extremely reduced and thus frame transmission or reception and channel scanning are impossible. In a case where the STA usually operates in the power save mode, the STA is in the doze state and, when necessary, transitions to the awake state, thereby reducing power consumption. The awake state may also be expressed by the term 'active mode', and the doze state may also be expressed by the term 'sleep mode'. The active mode (or awake state) and the sleep mode (or doze state) may be a mode for power saving of the STA (power save mode) (or power state).

It may be difficult for an STA operating in a power save mode in the existing WLAN to support a real time application (e.g., a voice over internet protocol (VoIP)).

In the existing power save mode, a trigger frame is transmitted at every service interval. Therefore, a trigger frame transmitted from a great number of STAs in a dense environment may cause an increase in channel congestion. More specifically, in the existing power save mode, in order to satisfy a jitter requirement (e.g., 30 ms) of a VoIP service, the STA may transmit an uplink trigger frame to the AP at every service interval (or trigger interval) (e.g., 20 ms). When such a large amount of uplink trigger frames are transmitted, signal flooding may be caused in a high dense WLAN environment.

Hereinafter, an embodiment of the present invention discloses an unscheduled hybrid automatic power save delivery (U-HAPSD) for solving a problem when operating in the existing power save mode. The U-HAPSD according to the embodiment of the present invention may be used to support a real time service (e.g., interactive video, VoIP, etc.).

If the STA uses the U-HAPSD, the STA may receive a service based on a real time application without having to frequently transmit an uplink trigger frame. Since the STA does not frequently transmit the uplink trigger frame, signal flooding may not be caused. Further, if the STA uses the U-HAPSD, the STA may save more power than when operating in the existing power save mode.

FIG. 2 is a concept view illustrating a U-HAPSD procedure according to an embodiment of the present invention.

In FIG. 2, disclosed is a method in which an AP transmits information regarding the presence of pending downlink data (or downlink data (or a downlink frame) to be transmitted) on a downlink frame/null data frame.

Referring to FIG. 2, an STA may transmit a trigger frame 200 in a U-HAPSD initiation service period 250. The trigger frame 200 may trigger transmission of a pending downlink frame of the AP. The STA may receive an ACK frame 205 for the trigger frame 200 from the AP, and may receive a downlink frame 215 from the AP on the basis of the trigger frame 200 on the U-HAPSD initiation service period 250.

End of service period (EOSP) information included in the downlink frame 215 transmitted by the AP may indicate whether a service period ends. If the EOSP information included in the downlink frame 215 indicates the end of the service period (e.g., if EOSP=1), the STA may transmit an ACK frame 220 for the downlink frame 215 to the AP and thereafter may transition to a doze state (or a sleep state). Further, MoreData information included in the downlink frame 215 may indicate the presence of a pending downlink frame to be received additionally by the STA. If the MoreData information is 0, the absence of a downlink frame to be received additionally by the STA in the service period may be indicated.

The STA may monitor a downlink frame or null data frame transmitted from the AP without having to transmit the trigger frame in a U-HAPSD continuing service period.

The AP may transmit the downlink frame or the null data frame to the STA according to the presence/absence of a pending downlink frame on the U-HAPSD continuing service period. More specifically, after the start of the U-HAPSD continuing service period, the AP may determine the presence/absence of the pending downlink frame. In the presence of the pending downlink frame, the AP may transmit the downlink frame to the STA without having to receive the trigger frame. On the other hand, in the absence of the pending downlink frame, the AP may transmit the null data frame to the STA. The null data frame may be a frame including only header information without a data field (or payload) or may be a frame including a pending data field (or payload).

The null data frame may include a null data packet indication indicating the absence of pending data. For example, the null data packet indication may be EOSP or MoreData. The EOSP of the null data frame which is set to 1 may indicate the end of the U-HAPSD continuing service period. Further, the MoreData of the null data frame which is set to 0 may indicate the absence of downlink data to be transmitted in the service period.

In a U-HAPSD continuing service period-1 260, operations of the AP and the STA are initiated in the presence of a pending downlink frame 230.

In the U-HAPSD continuing service period-1 260, the STA may monitor the downlink frame 230 or null data frame transmitted from the AP without having to transmit the trigger frame. In the presence of the pending downlink frame 230 in the AP, the AP may transmit the downlink frame 230 to the STA. The STA may receive the downlink frame 230, and may determine whether to transition a power state from an awake state to a doze state on the basis of the EOSP information and MoreData information included in the downlink frame 230. If the EOSP information and/or More Data information of the downlink frame indicate the presence of additional pending downlink data, the STA may maintain the awake state on the U-HAPSD continuing service period-1 260. On the contrary, if the EOPS information and/or the More Data information indicate the absence of the additional pending downlink data, the remaining STAs may transition to the doze state on the U-HAPSD continuing service period-1 260.

In a U-HAPSD continuing service period-2 270, the operations of the AP and the STA are initiated in the absence of the pending downlink frame in the AP.

In the U-HAPSD continuing service period-2 270, the STA may monitor the downlink frame or null data frame transmitted from the AP without having to transmit the trigger frame. In the absence of the pending downlink frame, the AP may transmit a null data frame 240 to the STA. The STA may receive the null data frame 240, and may transition a power state from an awake state to a doze state.

Figure 3:
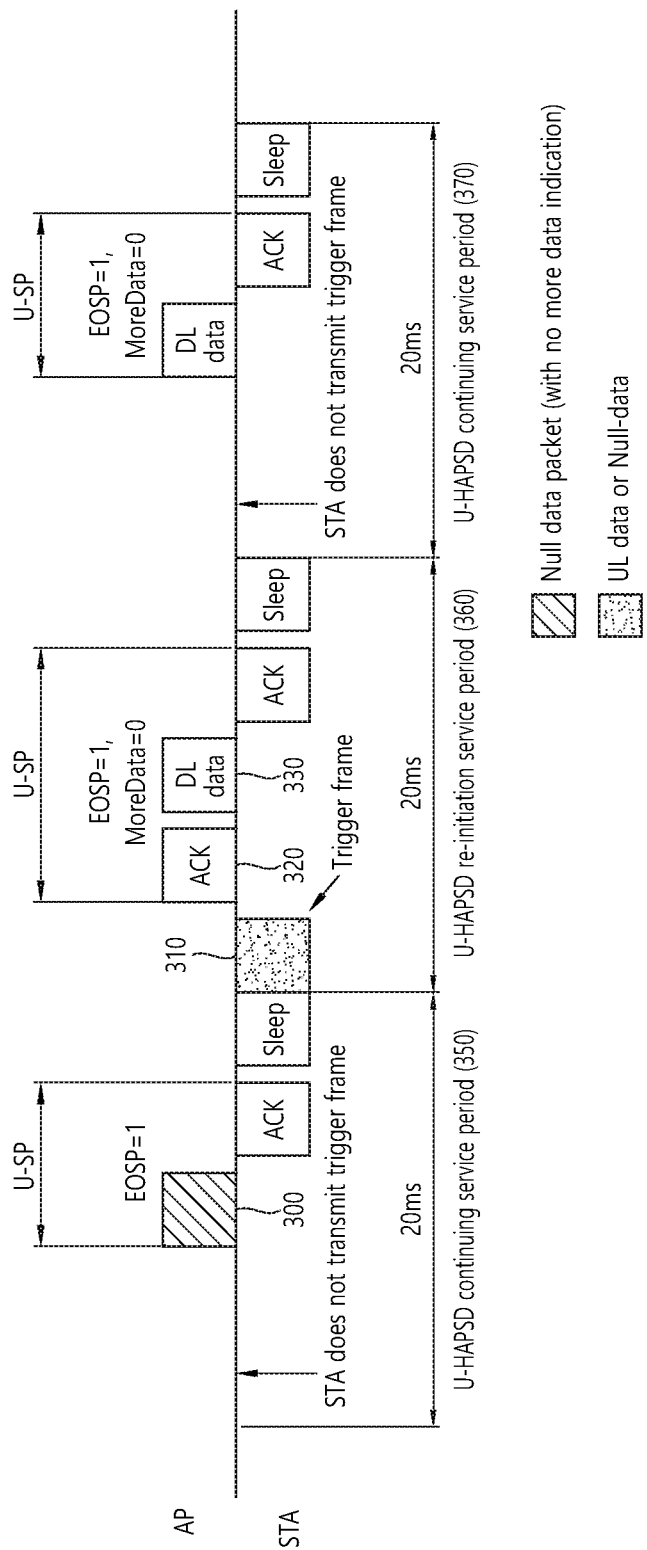
FIG. 3 is a concept view illustrating a U-HAPSD procedure according to an embodiment of the present invention.

FIG. 3 is a concept view illustrating a U-HAPSD procedure according to an embodiment of the present invention.

In FIG. 3, disclosed is a U-HAPSD procedure performed after receiving a null data frame 300 of an STA.

Referring to FIG. 3, the STA may receive the null data frame 300 on a U-HAPSD continuing service period 350, and thereafter may maintain a doze state on the remaining U-HAPSD continuing service periods. According to the embodiment of the present invention, a service period which comes after the U-HAPSD continuing service period 350 in which the null data frame 300 is received may be set to a U-HAPSD re-initiation service period 360. That is, the STA may retransmit a trigger frame 310 on the U-HAPSD re-initiation service period 360 and may trigger transmission of a downlink frame 330 of the AP.

The STA may transmit the trigger frame 310 to the AP after the start of the U-HAPSD re-initiation service period 360. The AP may transmit an ACK frame 320 for the trigger frame 310 to the STA, and in the presence of the pending downlink frame 330, may transmit the downlink frame 330 to the STA. A service period which comes after the U-HAPSD re-initiation service period 360 may be set again to a U-HAPSD continuing service period 370.

Figure 4:
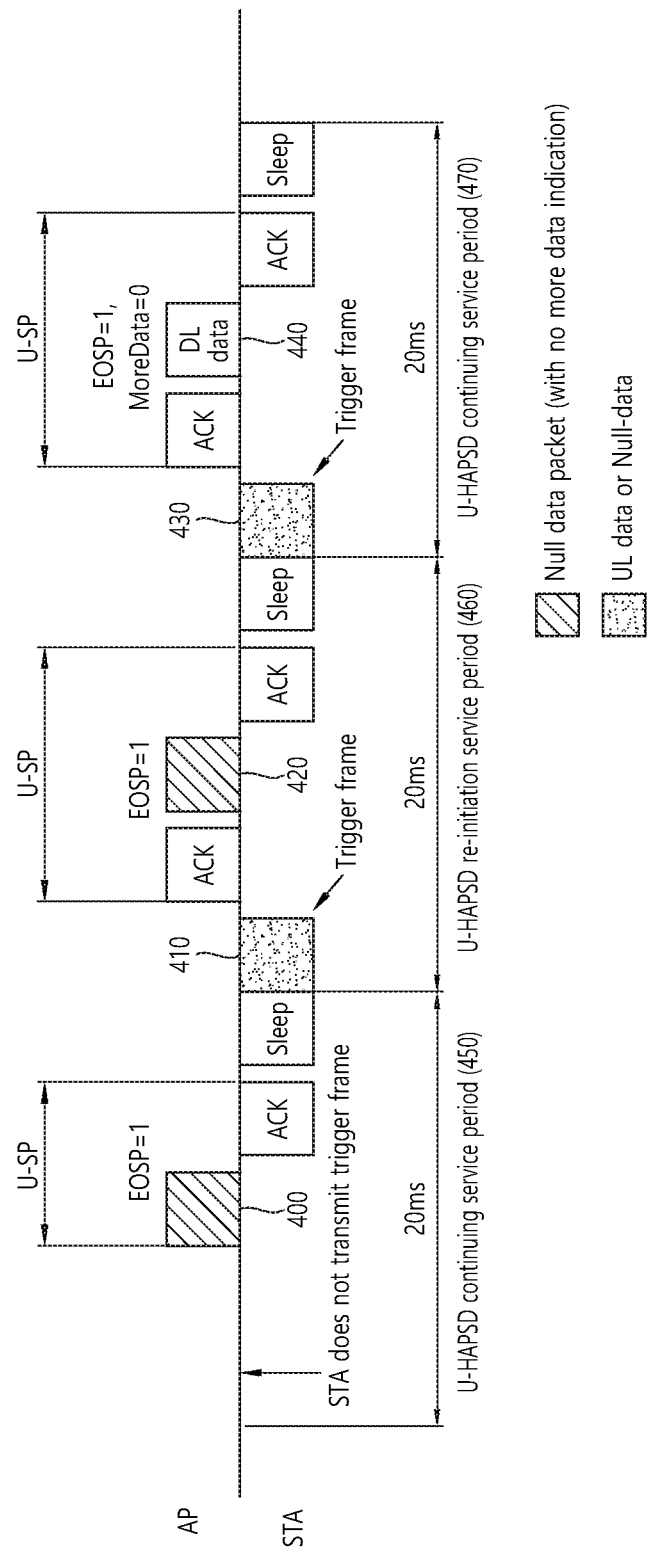
FIG. 4 is a concept view illustrating a U-HAPSD procedure according to an embodiment of the present invention.

FIG. 4 is a concept view illustrating a U-HAPSD procedure according to an embodiment of the present invention.

In FIG. 4, disclosed is a U-HAPSD procedure performed after receiving a null data frame 400 of an STA.

Referring to FIG. 4, the STA may receive the null data frame 400 on a U-HAPSD continuing service period 450, and thereafter may maintain a doze state on the remaining U-HAPSD continuing service periods.

Similarly to the description of FIG. 3, the STA may transmit a trigger frame 410 to the AP after the start of a U-HAPSD re-initiation service period 460. The AP may transmit an ACK frame for the trigger frame 410 to the STA. If there is no pending downlink frame, the AP may retransmit a null data frame 420 to the STA. In this case, the STA may transition from an awake state to a doze state. In this case, a service period which comes after the U-HAPSD re-initiation service period 460 may be set again to a U-HAPSD re-initiation service period 470.

A null data packet indication included in a null data frame transmitted by the AP in the U-HAPSD procedure according to the embodiment of the present invention may have various information formats. For example, the null data packet indication may be a MoreData field of a MAC header. If the MoreData field is set to 0, the absence of additional pending data may be indicated. Alternatively, the null data packet indication may be included in a physical layer protocol data unit (PPDU) header for delivering the null data frame. The null data frame may have various frame formats.

Figure 5:
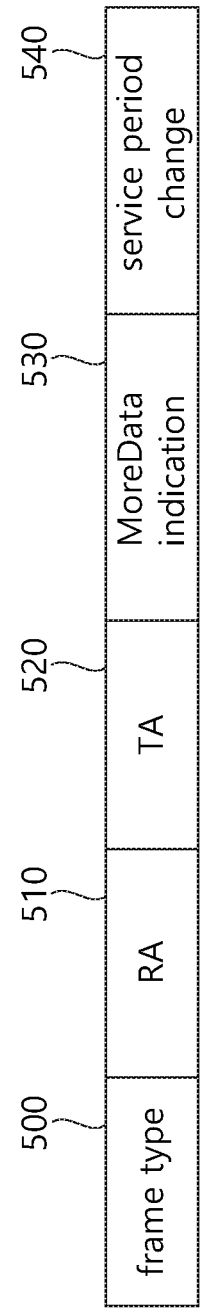
FIG. 5 is a concept view illustrating a null data frame according to an embodiment of the present invention.

FIG. 5 is a concept view illustrating a null data frame according to an embodiment of the present invention.

In FIG. 5, disclosed is a null data packet (NDP) downlink buffered data announcement frame used as a null data frame including minimum header information. The NDP downlink buffered data announcement frame may be a control frame. The NDP downlink buffered data announcement frame is only one example, and thus various control frames or management frames may be used as the null data frame.

Referring to FIG. 5, the NDP downlink buffered data announcement frame may include a frame type field 500, a receiver address (RA) field 510, a transmitter address (TA) field 520, a More Data indication field 530, and a service period change field 540.

The frame type field 500 may include information regarding a type of a transmitted frame. The information included in the frame type field 500 may indicate the NDP downlink buffered data announcement frame. 3 bits may be allocated for the frame type field 500.

The RA field 510 may include identification information (e.g., MAC address) of an STA for receiving the NDP downlink buffered data announcement frame.

The TA field 520 may include identification information (e.g., MAC address) of an AP for transmitting the NDP downlink buffered data announcement frame.

The MoreData indication field 530 may indicate the presence/absence of buffering (pending) data in the AP. The MoreData indication field 530 may be a null data packet indication.

The service period change field 540 may include information for changing a length of a service period. For example, if the service period change field 540 has a value of 0, a previous service period may be maintained. If the service period change field 540 has a value of 1, the service period may be set to 2 times the previous service period. If the service period change field 540 has a value of 2, the service period may be set to 4 times the previous service period. If the service period change field 540 has a value of 3, the service period may be set to 8 times the previous service period. If 3 bits are allocated for the service period change field 540, 4 to 7 may be reserved values.

The U-HAPSD procedure may be performed on the basis of the service period changed on the basis of the service period change field 540.

Figure 6:
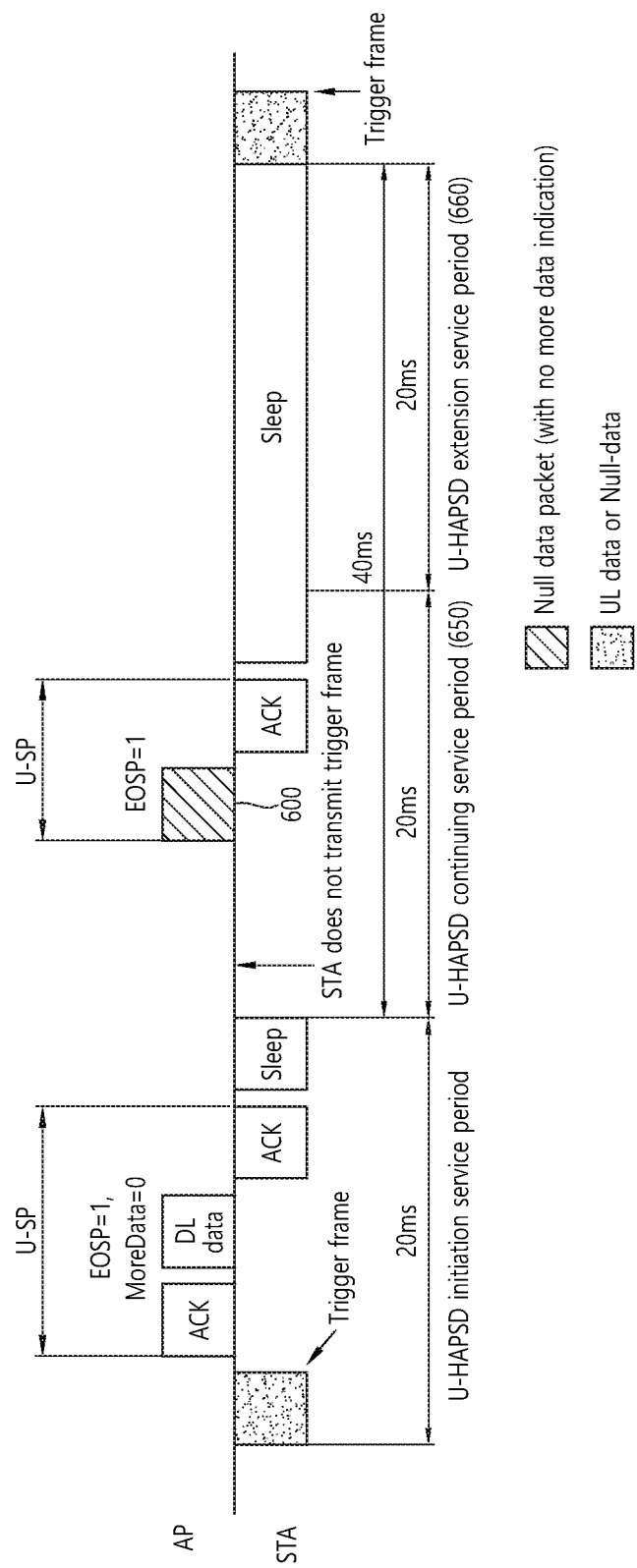
FIG. 6 is a concept view illustrating a U-HAPSD procedure according to an embodiment of the present invention.

FIG. 6 is a concept view illustrating a U-HAPSD procedure according to an embodiment of the present invention.

In FIG. 6, disclosed is a method of changing a service period for the U-HAPSD procedure.

Referring to FIG. 6, if there is no pending downlink data, an AP may transmit a null data frame 600.

A service period change field for changing the service period may be included in the null data frame 600. The AP may change the service period by considering the presence/absence of data to be transmitted to the STA during a specific time period (or by considering timing of downlink transmission to the STA). It is assumed in FIG. 6 that a length of the service period is set to 2 times the previous service period.

Upon receiving the null data frame 600, the STA may acquire information regarding a change of the service period on the basis of the service period change field. The service period extended (or changed) on the basis of the service period change field may be expressed by the term 'U-HAPSD extension service period' 660. The STA may maintain a doze state during the U-HAPSD extension service duration 660.

For example, if the length of the service period is set to 2 times the previous service period on the basis of the service period change field, after an ACK frame for the null data frame 600 is transmitted, the doze state may be maintained during the remaining U-HAPSD continuing service period 650 and U-HAPSD extension service period 660.

If the null data frame is transmitted by the AP, the STA may transition a power state from an awake state to the doze state, and a time of maintaining the doze state may be determined on the basis of a changed length of the service period indicated by the service period change field.

The U-HAPSD extension service period 660 may be followed by a U-HAPSD re-initiation service period. The STA may transition from the doze state to the awake date in the U-HAPSD re-initiation service period, and may transmit a trigger frame. A length of a service period which comes after the U-HAPSD extension service period 660 may be restored to a length of an original U-HAPSD service period (U-HAPSD initiation service period or U-HAPSD continuing service period). Alternatively, the length of the changed service duration may be maintained to extend the length of the U-HAPSD service period (U-HAPSD initiation service period or U-HAPSD continuing service period).

Figure 7:
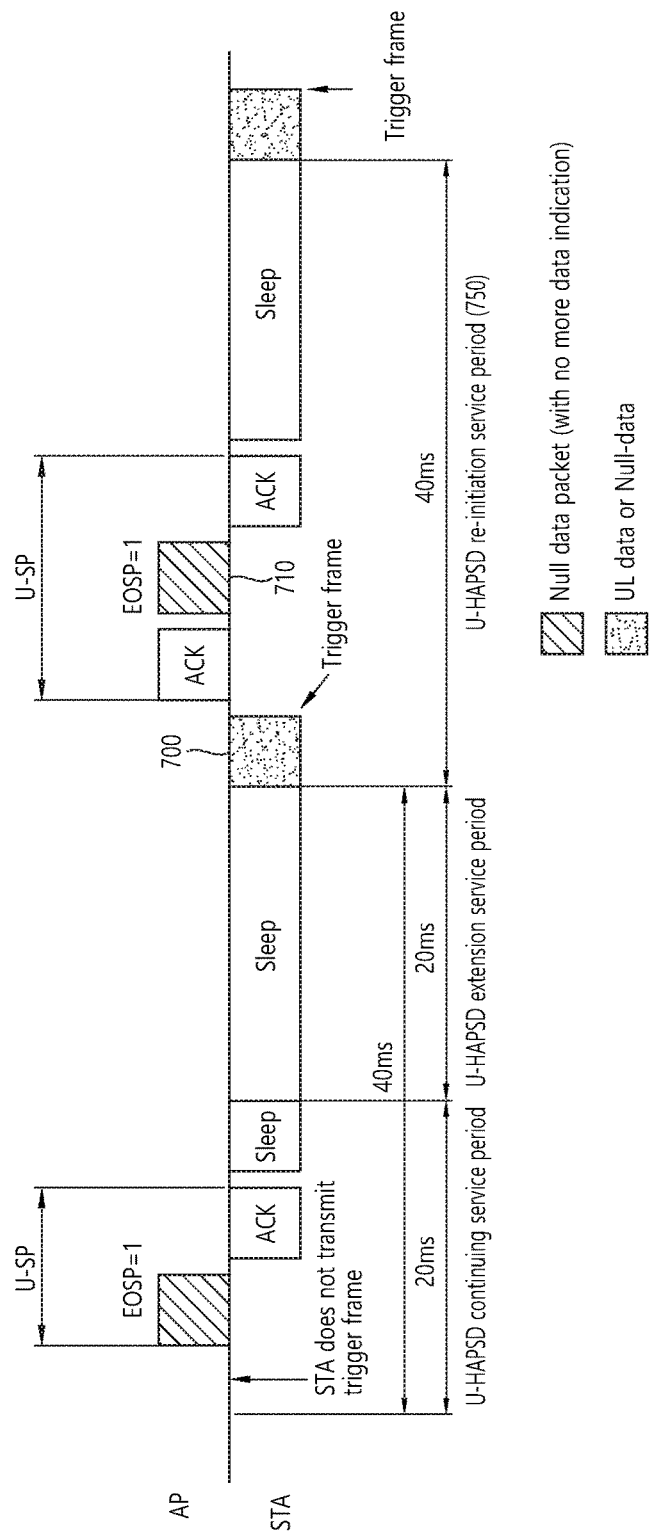
FIG. 7 is a concept view illustrating a U-HAPSD procedure according to an embodiment of the present invention.

FIG. 7 is a concept view illustrating a U-HAPSD procedure according to an embodiment of the present invention.

A U-HAPSD extension service period 740 may be followed by a U-HAPSD re-initiation service period 750. The U-HAPSD re-initiation service period 750 may be extended on the basis of a service period change field, or may have a length of an original service period.

In FIG. 7, disclosed is a U-HAPSD service period (U-HAPD initiation service period or U-HAPSD continuing service period) extended on the basis of a null data frame 710.

Referring to FIG. 7, the STA may transmit a trigger frame 700 to an AP in the U-HAPSD re-initiation service period 750. The AP may transmit an ACK frame for the trigger frame 700, and the AP may determine the presence/absence of a pending downlink frame transmitted to the STA.

In the U-HAPSD re-initiation service period 750 which comes after the U-HAPSD extension service period 740, there may be no pending downlink frame 710 in the AP. In this case, a length of the U-HAPSD re-initiation service period 750 may be extended on the basis of a service period change field of the null data frame 710 transmitted on the U-HAPSD re-initiation service period 750. The STA may receive the null data frame 710 and may maintain a doze state during the extended U-HAPSD re-initiation service period 750. If the null data frame is transmitted in the U-HAPSD re-initiation service period 750, a next service period may be set again to the U-HAPSD re-initiation service period, and the STA may transmit the trigger frame to the AP.

In case of FIG. 7, the service period change field of the null data frame 710 indicates 1, and the U-HAPSD re-initiation service period 750 is extended by twice. A U-HAPSD re-initiation service period of 20 ms may be extended to the U-HAPSD re-initiation service period 750 of 40 ms. 40 ms is only one example, and thus according to the service period change field, 80 ms, 180 ms, or the like may be set as the length of the U-HAPSD re-initiation service period.

Figure 8:
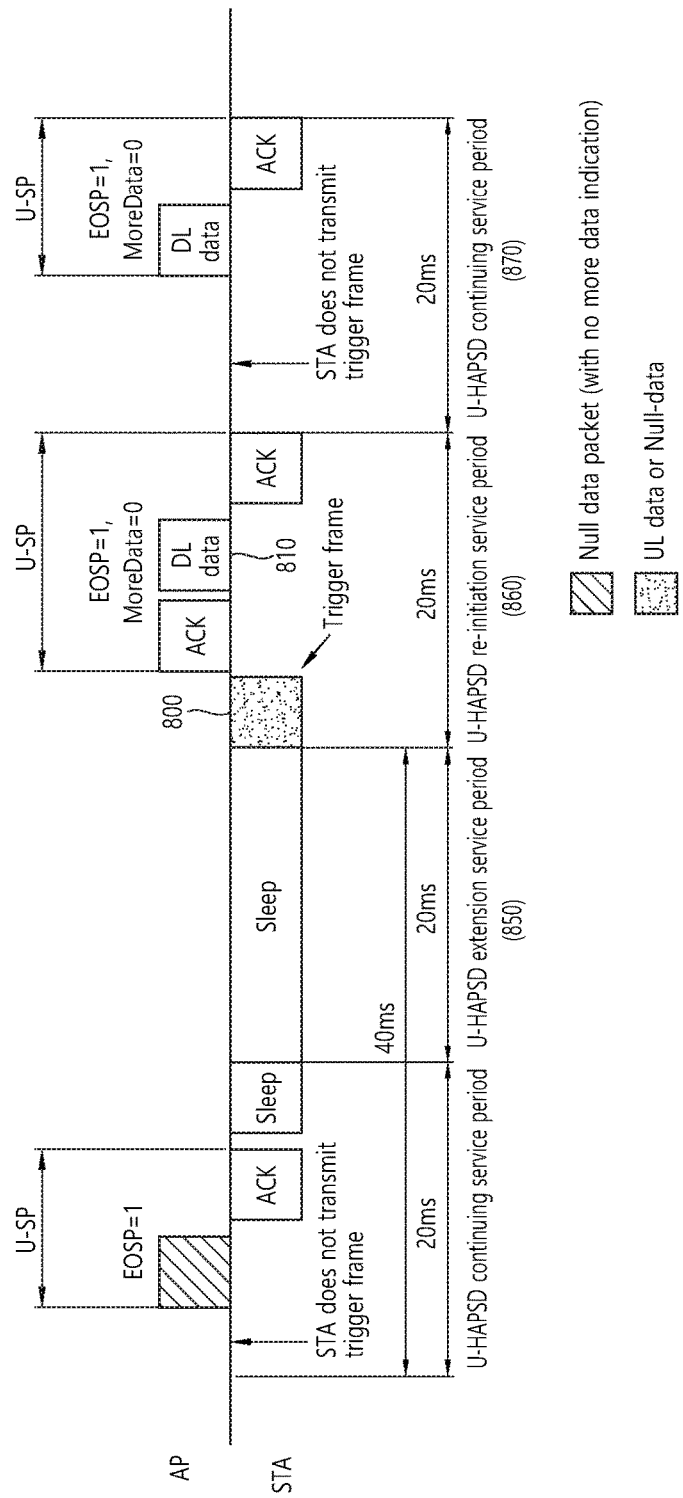
FIG. 8 is a concept view illustrating a U-HAPSD procedure according to an embodiment of the present invention.

FIG. 8 is a concept view illustrating a U-HAPSD procedure according to an embodiment of the present invention.

In FIG. 8, disclosed is a case where a pending downlink frame 810 exists in an AP in a U-HAPSD re-initiation service period 860 which comes after a U-HAPSD extension service period 850.

Referring to FIG. 8, an STA may transmit a trigger frame 800 to an AP in the U-HAPSD re-initiation service period 860. The AP may transmit an ACK frame for the trigger frame 800, and may determine whether the pending downlink frame transmitted to the STA exists in the AP.

If the pending downlink frame 810 exists in the AP, the AP may transmit the downlink frame 810 to the STA. The STA may transmit the ACK frame for the downlink frame 810 to the AP. If the downlink frame 810 is transmitted in the U-HAPSD re-initiation service period 860, a next service period may be set to a U-HAPSD continuing service period 870.

Figure 9:
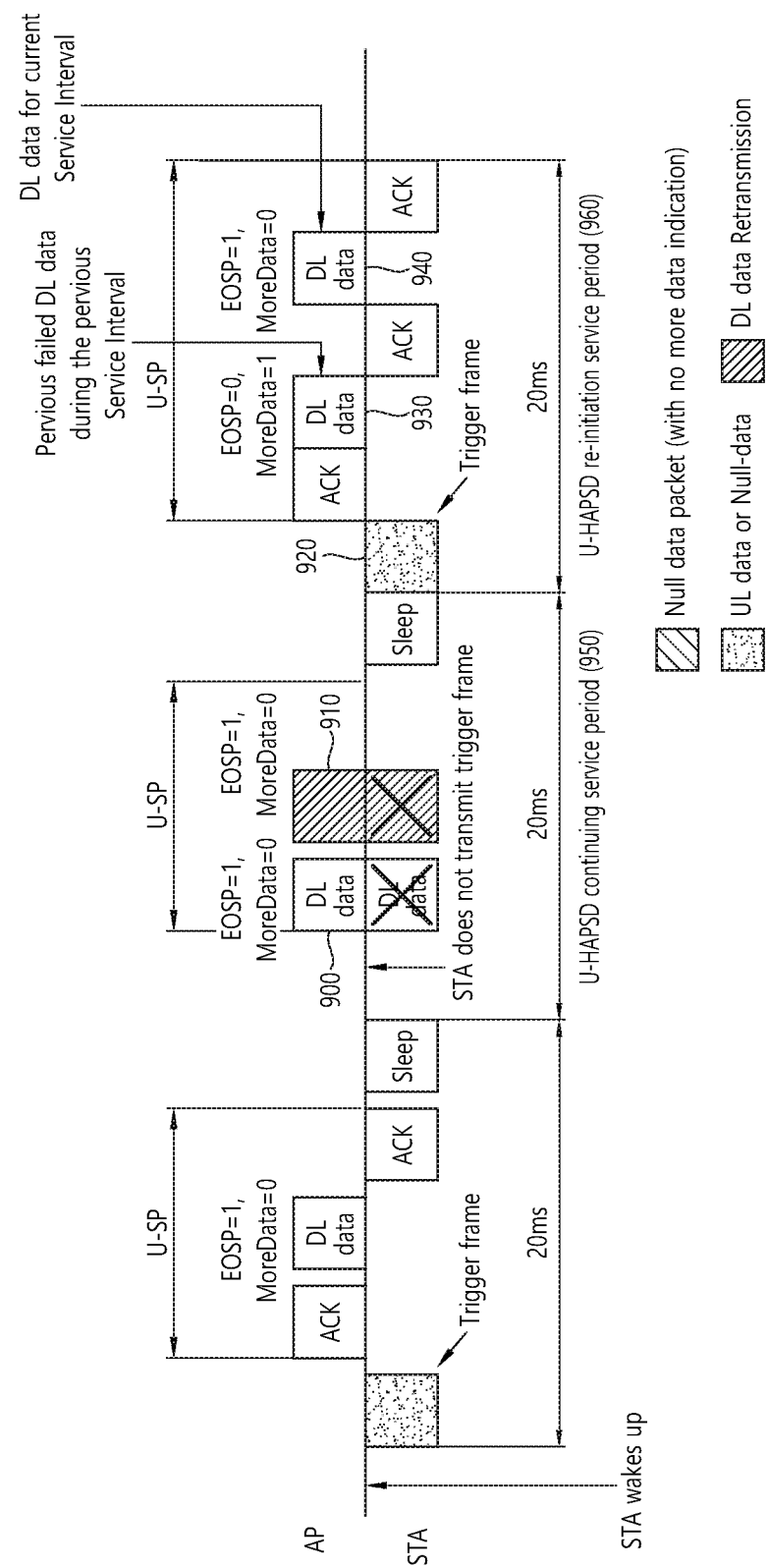
FIG. 9 is a concept view illustrating a U-HAPSD procedure according to an embodiment of the present invention.

FIG. 9 is a concept view illustrating a U-HAPSD procedure according to an embodiment of the present invention.

In FIG. 9, disclosed is a downlink frame retransmission procedure when transmission or reception of a downlink frame fails in a U-HAPSD continuing service period.

Referring to FIG. 9, an STA may monitor a downlink frame 900 transmitted in a U-HAPSD continuing service period 950. Due to a transmission failure of an AP or a reception failure of the STA, the downlink frame 900 may not be transmitted from the AP to the STA. For example, the AP may not be able to transmit the downlink frame 900 due to a channel access failure, and the STA may fail to decode the downlink frame 900.

If an ACK frame for the downlink frame 900 is not received, the AP may transmit a retransmission downlink frame 910.

If the downlink frame 900 or a null data frame is not received on a U-HAPSD continuing service period, the STA may monitor the downlink frame 900 for a specific period.

The AP may retransmit the downlink frame 900 only for a specific number of times or for a specific time period. For example, the downlink frame 900 may be retransmitted in a restricted manner only in one U-HAPSD continuing service period 950. If retransmission of the downlink frame 900 fails in the U-HAPSD continuing service period 950, a next service period may be set to a U-HAPSD re-initiation service period 960, and only when a trigger frame 920 is transmitted by the STA, the AP may retransmit a downlink frame 930 to the STA.

For another example, the AP may retransmit the downlink frame 900 by a predetermined maximum number of retransmission attempts, and after the downlink frame 900 is retransmitted by the maximum number of retransmission attempts, the downlink frame 900 may not be retransmitted.

The STA may monitor the downlink frame 900 retransmitted during a corresponding period by considering a retransmission execution period of the downlink frame 900 of the AP. If the downlink frame 900 is retransmitted in a restricted manner only in one service period, a maximum retransmission execution period of the downlink frame 900 may be continued until the current service period 950 expires. If the downlink frame 900 is retransmitted by only up to the determined maximum number of retransmission attempts, the maximum retransmission execution period of the downlink frame 900 may be a time required when retransmission is performed by the maximum number of retransmission attempts of the downlink frame 900.

If the STA fails to decode a downlink frame retransmitted by the AP on the U-HAPSD continuing service period 950, the STA may retransmit the trigger frame 920 to the AP on the U-HAPSD re-initiation service period 960.

If the AP fails to receive the ACK frame for the retransmission downlink frame 910 from the STA in the U-HAPSD continuing service period 950 (or if it fails to retransmit the downlink frame), the AP may monitor the trigger frame 920 retransmitted from the STA on the U-HAPSD re-initiation service period 960.

If the AP receives the retransmitted trigger frame 920 on the U-HAPSD re-initiation service period 960, the AP may retransmit the downlink frame 900 on the U-HAPSD re-initiation service period 960. If the AP has an additional different pending downlink frame 940 to be transmitted to the STA, the downlink frame 930 to be retransmitted may indicate the presence of the pending downlink frame 940 to be transmitted at a later time. For example, EOSP information of the downlink frame 930 to be retransmitted may be 0, and MoreData information may be 1. The STA may know the presence of the different pending downlink frame 940 in the AP on the basis of the EOSP information and/or the MoreData information. In the presence of the additional pending downlink data in the AP, the STA may maintain the awake mode and may monitor the different downlink frame 940 transmitted from the AP.

Figure 10:
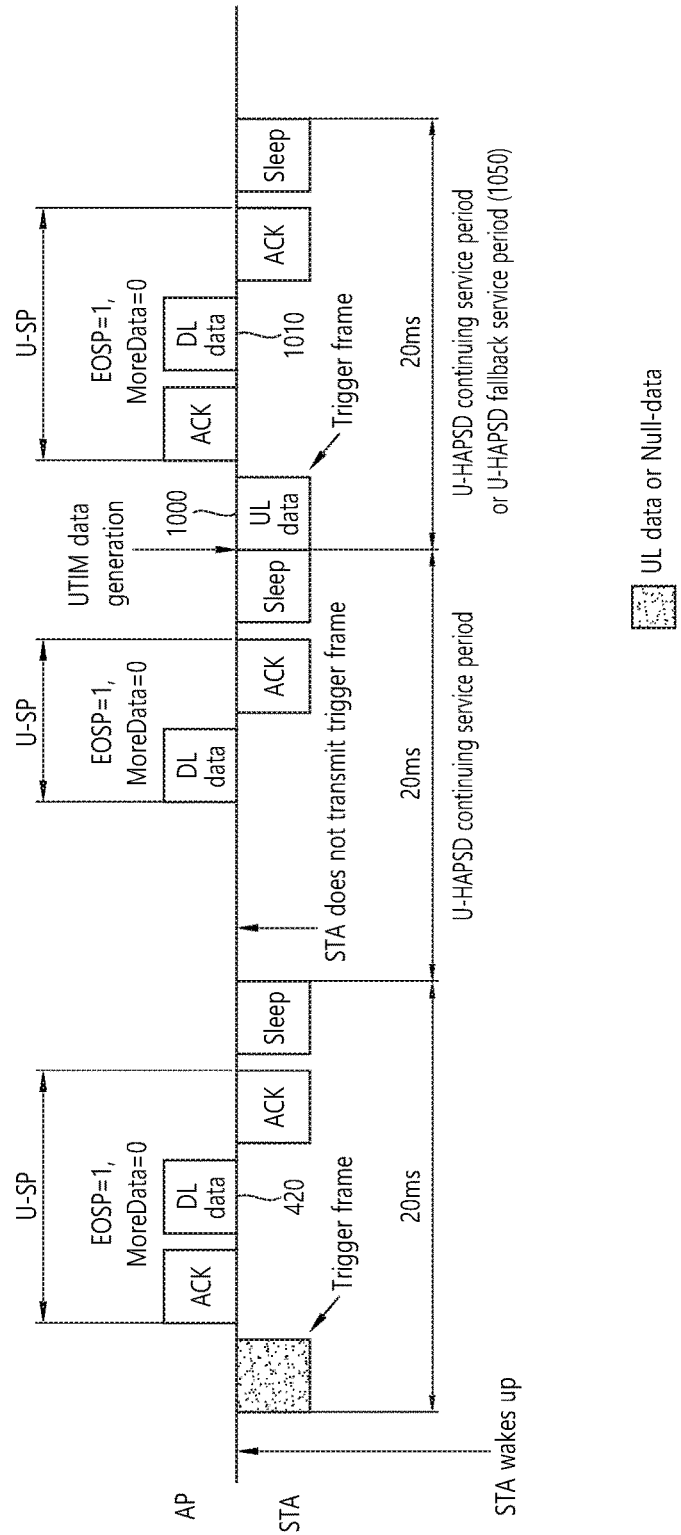
FIG. 10 is a concept view illustrating a method of transmitting uplink data of a station (STA) according to an embodiment of the present invention.

FIG. 10 is a concept view illustrating a method of transmitting uplink data of an STA according to an embodiment of the present invention.

In FIG. 10, disclosed is a method of transmitting a pending uplink frame 1000 to an AP by an STA when the pending uplink frame in the STA is generated on a U-HAPSD continuing service period 1050.

Referring to FIG. 10, upon generation of the pending uplink frame in the STA on the U-HAPSD continuing service period 1050, the STA may transmit the uplink frame 1000 to the AP prior to monitoring for a downlink frame. A service period in which the uplink frame 1000 is transmitted by the STA may be expressed by the term 'U-HAPSD fallback service period' 1050.

For example, in the U-HAPSD fallback service period 1050, the STA may transmit the uplink frame 1000 to the AP by performing channel access at a speed faster than transmission timing of a null data frame of a downlink frame indicating the end of the U-HAPSD continuing service period (EOSP=1) or indicating the absence of additional pending downlink data (MoreData=0).

Upon receiving the null data frame of the downlink frame indicating the end of the U-HAPSD continuing service period (EOSP=1) or indicating the absence of additional pending downlink data (MoreData=0), the STA transitions to the doze state. Therefore, the STA may transmit the uplink frame 1000 by performing channel access before transmission of the downlink frame.

Upon receiving the uplink frame 1000 from the STA, the AP may transmit an ACK frame 1020 for the uplink frame 1000 to the STA. In the presence of pending downlink data to be transmitted to the STA, the AP may transmit a downlink frame 1010 after transmission of the ACK frame.

Figure 11:
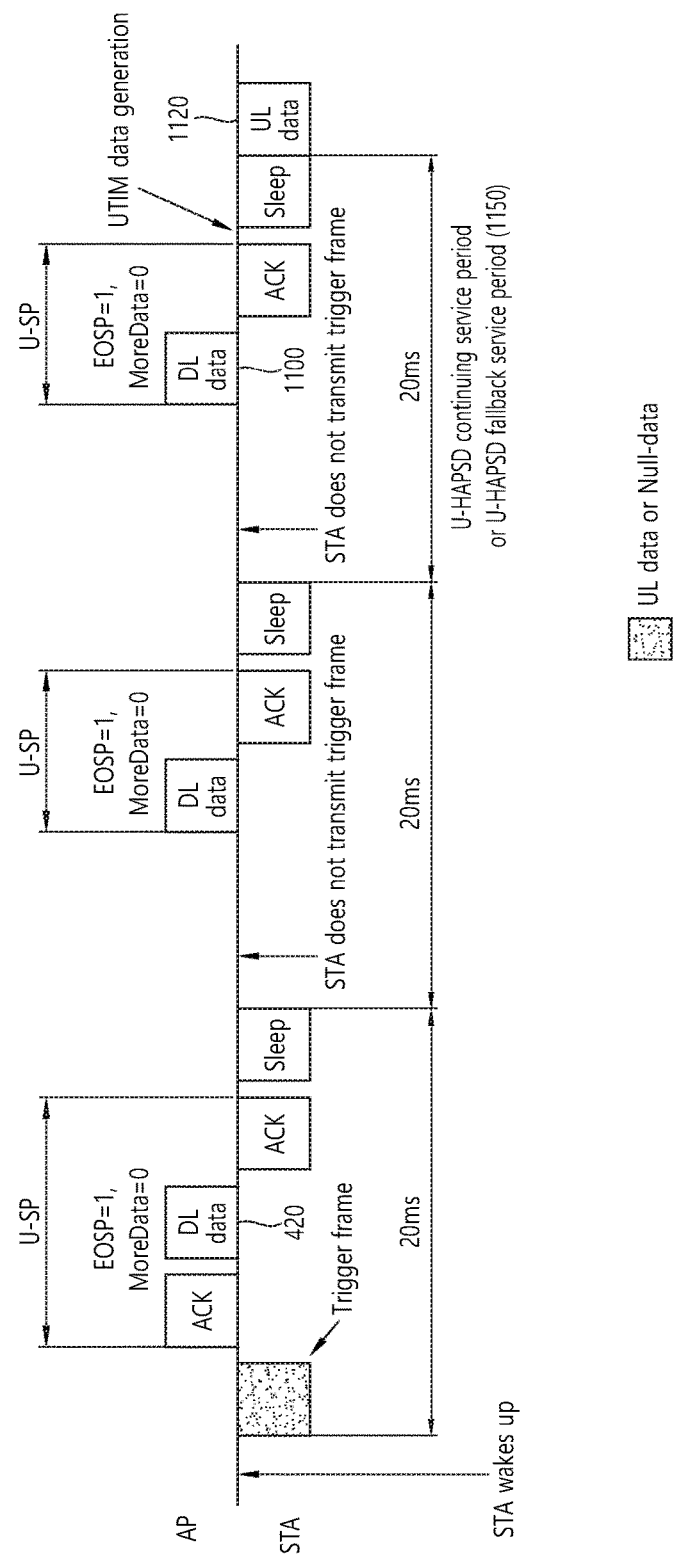
FIG. 11 is a concept view illustrating a method of transmitting uplink data of an STA according to an embodiment of the present invention.

FIG. 11 is a concept view illustrating a method of transmitting uplink data of an STA according to an embodiment of the present invention.

In FIG. 11, disclosed is a method of transmitting a pending uplink frame 1100 to an AP by an STA when the pending uplink frame in the STA is generated on a U-HAPSD continuing service period.

Referring to FIG. 11, the downlink frame 1100 may be transmitted to the STA to indicate the end of the U-HAPSD continuing service period (EOSP=1) or to indicate the absence of additional pending downlink data (MoreData=0). In this case, if the pending uplink frame in the STA is generated after receiving the downlink frame 1100, the STA cannot directly transmit an uplink frame 1120, and may transition to a doze state.

The STA may transmit an uplink frame by setting a next service period as a U-HAPSD fallback service period 1150. The STA may transmit the uplink frame 1120 before transmitting a downlink frame or a null data frame in the U-HAPSD fallback service period 1150.

If transmission of the uplink frame 1120 is complete in the U-HAPSD fallback service period 1150, a service period which comes after the U-HAPSD fallback service period 1150 may be set to the U-HAPSD continuing service period.

The STA may divide real time traffic according to a property. The real time traffic may be divided into live video, buffered video, interactive video (e.g., video conferencing), voice, etc.

A U-HAPSD procedure that can be used in a real time service is disclosed in an embodiment of the present invention. The U-HAPSD procedure may be used for an STA operating in a power save mode.

The existing access class, access category, or traffic indication (TID) may be not enough to specifically divide the category of the real time traffic. That is, an AC or TID for specifically dividing the category of the real time traffic such as the live video, the buffered video, the interactive video, the voice, or the like is not defined in the existing access class, access category, or TID.

When using the conventional technique, it is impossible for the STA to operate by using a different power save mode for each real time traffic. The STA cannot know whether traffic transmitted from a higher layer is live video or buffered video or interactive video.

Therefore, a method of dividing the category of the real time traffic by the STA may be performed as follows according to an embodiment of the present invention.

First, the STA may divide the category of the real time traffic on the basis of a domain name. A property of a service provided from a web site corresponding to each domain may be different, and thus the provided category of the real time traffic may also be different.

For example, if the domain name is www.mlbcom.com, the real time traffic category may be determined as live video, if the domain name is www.youtube.com, the real time traffic category may be determined as buffered video, and if the domain name is www.google.com, the real time traffic category may be determined as browsing.

A name of domain connected for a service may be transmitted to the STA on the basis of MLME primitive, and the STA may divide the category of the real time traffic to be transmitted or received.

According to another embodiment of the present invention, the category of the real time traffic may be divided by combining an operating system (OS) ID (e.g., Android or iOS) or an application (APP) ID (e.g., Skype, MLB TV app).

The STA may divide the real time traffic on the basis of the OS ID and the APP ID. For example, if the STA executes the MLB TV app, the STA OS ID (e.g., Android indication identifier) and APP ID (MLB TV indication identifier) may be reported to the AP by using the MLME primitive so that the STA can divide the real time traffic to be transmitted/received.

The STA may select a power save mode according to the category of the real time traffic. For example, according to the category of the real time traffic, the STA may not only use the U-HAPSD according to the embodiment of the present invention but also use one of PS-Poll, U-APSD, S-APSD, and PSMP.

Figure 12:
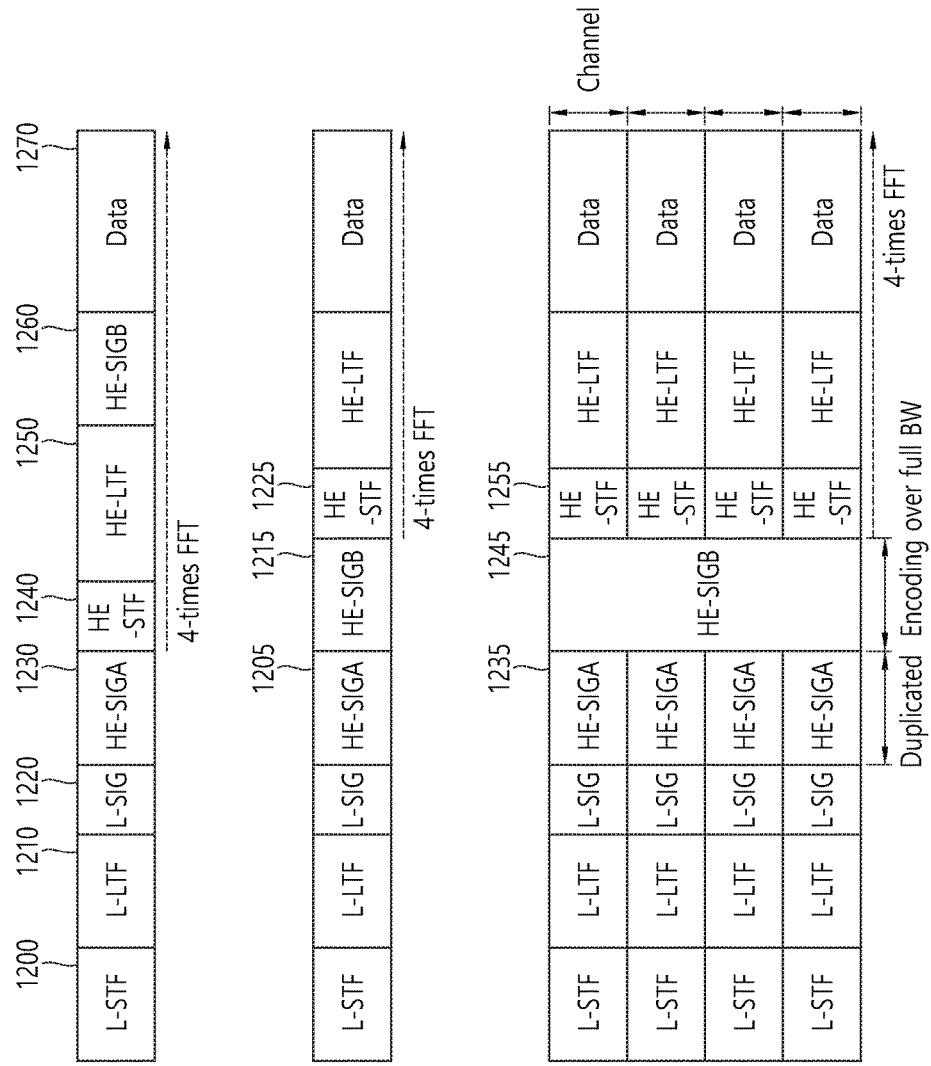
FIG. 12 is a concept view illustrating a physical layer protocol data unit (PPDU) format for transmitting a frame according to an embodiment of the present invention.

FIG. 12 is a concept view illustrating a PPDU format for transmitting a frame according to an embodiment of the present invention.

In FIG. 12, disclosed is the PPDU format according to the embodiment of the present invention. A PPDU header of the PPDU format may include a null data packet indication.

Referring to an upper portion of FIG. 12, the PHY header] of the downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PHY header may be divided into a legacy part before the L-SIG and a high efficiency (HE) part after the L-SIG.

An L-STF 1200 may include a short training orthogonal frequency division multiplexing (OFDM) symbol. The L-STF 1200 may be used for frame detection, automatic gain control (AGC), diversity detection, and coarse frequency/time synchronization.

An L-LTF 1210 may include a long training OFDM symbol. The L-LTE 1210 may be used for fine frequency/time synchronization and channel prediction.

An L-SIG 1220 may be used to transmit control information. The L-SIG 1220 may include information for a data rate and a data length.

According to the embodiment of the present invention, the HE-SIG A 1230 may include a null data packet indication. Alternatively, if the downlink channel is allocated to the plurality of STAs by being divided on the basis of orthogonal frequency division multiplexing access (OFDMA), the HE-SIG A 1230 may include information regarding a downlink dedicated operating channel allocated to each of the plurality of STAs. The downlink channel may include a plurality of lower downlink channels. For example, 20 MHz in a downlink channel of 40 MHz may be allocated to a first lower downlink channel used to transmit a downlink frame to an STA1 on the basis of OFDMA, and the remaining 20 MHz may be allocated to a second lower downlink channel to transmit a downlink frame to an STA2. The STA1 and the STA2 may perform a U-HAPSD operation respectively on the first lower downlink channel and the second lower downlink channel.

Further, the H-SIG A 1230 may include identification information of an STA to indicate a target STA for receiving a downlink PPDU. The plurality of STAs may operate on the same U-HAPSD period. In this case, the STA may determine whether the downlink PPDU is a PPDU targeted to the STA on the basis of the identification information included in the H-SIG A 1230 of the downlink PPDU. If the STA is indicated on the basis of the H-SIG A 1230 of the downlink PPDU, the STA may perform additional decoding on the downlink PPDU.

An HE-STF 1240 may be used to improve automatic gain control estimation in an MIMO environment or an OFDMA environment.

An HE-LTF 1250 may be used to estimate a channel in the MIMO environment or the OFDMA environment.

An HE-SIG B 1260 may include a length of physical layer service data unit (PSDU) for each STA, information regarding modulation and coding scheme (MCS), a tail bit, or the like.

A size of IFFT applied to the HE-STF 1240 and a field next to the HE-STF 1240 may be different from a size of IFFT applied to a field prior to the HE-STF 1240. For example, the size of IFFT applied to the HE-STF 1240 and the field next to the HE-STF 1240 may be four times greater than the size of IFFT applied to the field prior to the HE-STF 1240. The STA may receive the HE-SIG A 1230, and may be instructed to receive a downlink PPDU on the basis of the HE-SIG A 1230. In this case, the STA may perform decoding on the HE-STF 1240 and the field next to the HE-STF 1240 on the basis of a changed FFT size. On the contrary, if the STA is not instructed to receive the downlink PPDU on the basis of the HE-SIG A 1230, the STA may stop decoding and may configure a network allocation vector (NAV).

A cyclic prefix (CP) of the HE-STF 1240 may have a size greater than a CP of another field, and for this CP duration, the STA may perform decoding on the downlink PPDU by changing the FFT size.

An order of the field constructing the format of the PPDU disclosed in the upper portion of FIG. 12 may be changed. For example, as disclosed in a middle portion of FIG. 12, an HE-SIG B 1215 of an HE part may be located immediately next to an HE-SIG A 1205. The STA may perform decoding on the HE-SIG 1205 and up to the HE-SIG B 1215, may receive necessary control information, and may configure an NAV. Likewise, a size of IFFT applied to an HE-STF 1225 and a field next to the HE-STF 1225 may be different from a size of IFFT applied to a field prior to the HE-STF 1225.

The STA may receive the HE-SIG A 1205 and the HE-SIG B 1215. If it is instructed to receive the downlink PPDU by the STA identifier field of the HE-SIG A 1205, the STA may perform decoding on the downlink PPDU starting from the HE-STF 1225 by changing the FFT size. On the contrary, the STA may receive the HE-SIG A 1205, and if it is not instructed to receive the downlink PPDU on the basis of the HE-SIG A 1205, may configure the NAV.

Referring to a lower portion of FIG. 12, a downlink PPDU format for DL MU transmission is disclosed. The downlink PPDU may be transmitted to the STA through a different downlink transmission resource (a frequency resource or a spatial stream). That is, the downlink PPDU may be transmitted to the plurality of STAs through a lower downlink channel. On the basis of this method, the plurality of STAs and the AP may perform communication based on the U-HAPSD procedure.

A field prior to an HE-SIG B 1245 on the downlink PPDU may be transmitted in a duplicated form in each of different uplink transmission resources. The HE-SIG B 1245 may be transmitted on all transmission resources in an encoded form. A field next to the HE-SIG B 1245 may include individual information for each of the plurality of STAs for receiving the downlink PPDU.

If the field included in the downlink PPDU is transmitted through each of the downlink transmission resources, a CRC for each field may be included in the downlink PPDU. On the contrary, if a specific field included in the downlink PPDU is transmitted by being encoded on all downlink transmission resources, a CRC for each field may not be included in the downlink PPDU. Therefore, an overhead for the CRC may be decreased. That is, the downlink PPDU format for DL MU transmission according to the embodiment of the present invention may decrease the CRC overhead of the downlink frame by using the HE-SIG B 1245 in an encoded form on all transmission resources.

For example, it may be assumed a case where the AP transmits the downlink PPDU through DL MU OFDMA transmission. If one channel bandwidth is 20 MHz, upon receiving the downlink PPDU, the STA may receive HE-SIG A transmitted through 20 MHz and a downlink transmission resource may be allocated thereto through decoding. For example, the HE-SIG A 1235 may indicate that a downlink channel allocated to the STA is 80 MHz, and the STA may decode a field which comes after the HE-SIG A 1235 transmitted through the downlink channel of 80 MHz.

Likewise, also in a downlink PPDU format for DL MU transmission, an HE-STF 1255 and a field next to the HE-STF 1255 may be encoded on the basis of an IFFT size different from that of a field prior to the HE-STF 1255. Therefore, the STA may receive an HE-SIG A 1235 and the HE-SIG B 1245, and if it is instructed to receive the downlink PPDU on the basis of the HE-SIG A 1235, may perform decoding on the downlink PPDU by changing an FFT size.

Figure 13:
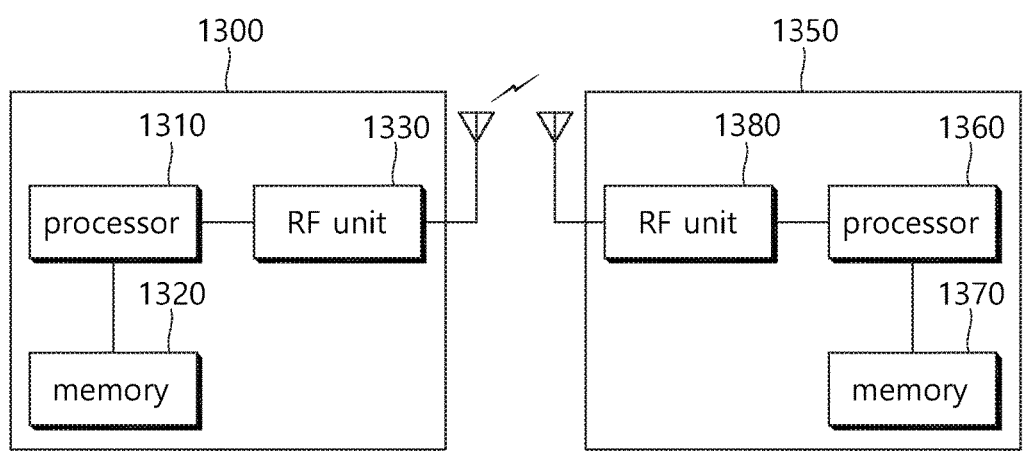
FIG. 13 is a block diagram illustrating a wireless device according to an embodiment of the present invention.

FIG. 13 is a block diagram illustrating a wireless device according to an embodiment of the present invention.

Referring to FIG. 13, a wireless device 1300 is an STA capable of implementing the aforementioned embodiment, and may be an AP 1300 or a non-AP STA (or STA) 1350.

The AP 1300 includes a processor 1310, a memory 1320, and a radio frequency (RF) unit 1330.

The RF unit 1330 may be coupled to the processor 1310 to transmit/receive a radio signal.

The processor 1310 may implement the functions, procedures, and/or methods proposed in the present invention. For example, the processor 1310 may be implemented to perform an operation of the wireless device according to the aforementioned embodiment of the present invention. The processor may perform the operation of the wireless device disclosed in the embodiment of FIG. 2 to FIG. 12.

For example, the processor 1310 may receive a trigger frame from the STA and transmit a pending downlink frame on a first service period (e.g., a U-HAPSD initiation service period). Further, the processor 1310 may be implemented such that the AP transmits a pending downlink frame or a null data frame to the STA according to the presence/absence of the pending downlink frame for the STA on a second service period (e.g., a U-HAPSD initiation service period).

An STA 1350 includes a processor 1360, a memory 1370, and an RF unit 1380.

The RF unit 1380 may be coupled to the processor 1360 to transmit/receive a radio signal.

The processor 1360 may implement the functions, procedures, and/or methods proposed in the present invention. For example, the processor 1320 may be implemented to perform an operation of the wireless device according to the aforementioned embodiment of the present invention. The processor may perform the operation of the wireless device disclosed in the embodiment of FIG. 2 to FIG. 12.

For example, the processor 1360 may be implemented to transmit the first trigger frame to the AP on the first service period (e.g., the U-HAPSD initiation service period), and to receive a downlink frame transmitted by the AP on the basis of a first trigger frame on the first service period.

Further, the processor 1360 may be configured to monitor a pending downlink frame or null data frame transmitted from the AP on the second service period (e.g., the U-HAPSD continuing service period) after receiving the downlink frame, and to determine a power state according to whether the pending downlink frame or the null data frame is received on the second service period.

The pending downlink frame may be transmitted by the AP in the presence of the pending downlink data for the STA. The null data frame may be transmitted by the AP in the absence of the pending downlink data.

Further, the processor 1360 may be implemented to monitor the pending downlink frame by considering a maximum retransmission execution period. The maximum retransmission execution period may be a maximum time period in which the pending downlink frame is retransmitted, and the maximum retransmission execution period may be determined by considering a maximum number of retransmission attempts of the AP. If the pending downlink frame is not transmitted by the AP until the maximum retransmission execution period, the processor 1360 may be implemented to transmit a second trigger frame to the AP on a third service period (e.g., a U-HAPSD re-initiation service period).

The processors 1310 and 1360 may include application-specific integrated circuits (ASICs), other chipsets, logical circuits, data processing devices, and/or converters for mutually converting a baseband signal and a radio signal. The memories 1320 and 1370 may include a read-only memory (ROM), a random access memory (RAM), a flash memory, a memory card, a storage medium and/or other storage devices. The RF units 1330 and 1380 may include at least one antenna to transmit and/or receive the radio signal.

When the above-described embodiment is implemented in software, the above-described scheme may be implemented using a module (process or function) which performs the above function. The module may be stored in the memories 1320 and 1370 may be and executed by the processors 1310 and 1360. The memories 1320 and 1370 may be disposed to the processors 1310 and 1360 internally or externally and connected to the processors 1310 and 1360 using a variety of well-known means.

What is claimed is:

1. A method operating based on a power save mode in a wireless local area network (WLAN), the method comprising:
    transmitting, by a station (STA), a first trigger frame to an access point (AP) on a first service period;
    receiving, by the STA, a first downlink frame transmitted by the AP on a basis of the first trigger frame on the first service period;
    monitoring, by the STA, a second downlink frame if the second downlink frame is present in the AP or null data frame if the second downlink frame is absent in the AP on a second service period after receiving the first downlink frame; and
    determining, by the STA, whether to transition a power saving mode from an awake state to a doze state based on End of service period (EOSP) information and More Data information included in the second downlink frame if the second downlink frame is transmitted by the AP; and
    transitioning, by the STA, the power saving mode from the awake state to the doze state if the null data frame is transmitted by the AP,
    wherein the null data frame comprises a service period change field,
    wherein the service period change field comprises information on a length of the second service period,
    wherein if the service period change field indicates 0, the length of the second service period is set to a length of the first service period,
    wherein if the service period change field indicates 1, the length of the second service period is set to 2 times the length of the first service period,
    wherein if the service period change field indicates 2, the length of the second service period is set to 4 times the length of the first service period,
    wherein if the service period change field indicates 3, the length of the second service period is set to 8 times the length of the first service period, and
    wherein the doze state is maintained until an end of the second service period.

2. The method of claim 1, wherein the determining whether to transition the power saving mode comprises:
    maintaining, by the STA, the power saving mode as the awake state on the second service period if the EOSP information and the More Data information indicate a presence of a third downlink frame; and
    transitioning, by the STA, the power saving mode from the awake state to the doze state on the second service period if the EOSP information and the More Data information indicate an absence of the third downlink frame.

3. The method of claim 1,
    wherein the null data frame further comprises a pending data indication field, and
    wherein the pending data indication field comprises information indicating the presence/absence of the second downlink frame.

4. The method of claim 1, further comprising
    monitoring, by the STA, the second downlink frame by considering a maximum retransmission execution period,
    wherein the maximum retransmission execution period is a maximum time period in which retransmission is executed for the second downlink frame, and
    wherein the maximum retransmission execution period is determined by considering a maximum number of retransmission attempts of the AP.

5. The method of claim 4, further comprising
    transmitting, by the STA, a second trigger frame to the AP on a third service period if the STA fails to receive the second downlink frame before the maximum retransmission execution time,
    wherein the second trigger frame triggers transmission of the second downlink frame by the AP on the third service period.

6. A station (STA) operating based on a power save mode in a wireless local area network (WLAN), the STA comprising:
    a radio frequency (RF) unit implemented to transmit or receive a radio signal; and
    a processor operatively coupled to the RF unit,
    wherein the processor is implemented to:
    transmit a first trigger frame to an access point (AP) on a first service period;
    receive a first downlink frame transmitted by the AP on a basis of the first trigger frame on the first service period;
    monitor a second downlink frame if the second downlink frame is present in the AP or null data frame if the second downlink frame is absent in the AP on a second service period after receiving the first downlink frame;
    determine whether to transition a power saving mode from an awake state to a doze state based on End of service period (EOSP) information and More Data information included in the second downlink frame if the second downlink frame is transmitted by the AP; and
    transition the power saving mode from the awake state to the doze state if the null data frame is transmitted by the AP,
    wherein the null data frame comprises a service period change field,
    wherein the service period change field comprises information on a length of the second service period,
    wherein if the service period change field indicates 0, the length of the second service period is set to a length of the first service period, wherein if the service period change field indicates 1, the length of the second service period is set to 2 times the length of the first service period, wherein if the service period change field indicates 2, the length of the second service period is set to 4 times the length of the first service period, wherein if the service period change field indicates 3, the length of the second service period is set to 8 times the length of the first service period, and wherein the doze state is maintained until an end of the second service period.

7. The STA of claim 6, wherein the processor is implemented to maintain the power saving mode as the awake state on the second service period if the EOSP information and the More Data information indicate a presence of a third downlink frame, and to transition the power saving mode from the awake state to the doze state on the second service period if the EOSP information and the More Data information indicate an absence of the third downlink frame.

8. The STA of claim 6, wherein the null data frame further comprises a pending data indication field, and wherein the pending data indication field comprises information indicating the presence/absence of the second downlink frame.

9. The STA of claim 6, wherein the processor is implemented to monitor the second downlink frame by considering a maximum retransmission execution period, wherein the maximum retransmission execution period is a maximum time period in which retransmission is executed for the second downlink frame, and wherein the maximum retransmission execution period is determined by considering a maximum number of retransmission attempts of the AP.

10. The STA of claim 9, wherein if the second downlink frame is not transmitted by the AP before the maximum retransmission execution time, the processor is implemented to transmit a second trigger frame to the AP on a third service period, and wherein the second trigger frame triggers transmission of the second downlink frame by the AP on the third service period.

* * * * *